(12) United States Patent
Motwani

(10) Patent No.: US 11,061,597 B2
(45) Date of Patent: Jul. 13, 2021

(54) SUPPORTING LIVE MIGRATIONS AND RE-BALANCING WITH A VIRTUAL STORAGE UNIT

(71) Applicant: International Business Machines Corporation, Armonk, NY (US)

(72) Inventor: Manish Motwani, Chicago, IL (US)

(73) Assignee: Pure Storage, Inc., Mountain View, CA (US)

(*) Notice: Subject to any disclaimer, the term of this patent is extended or adjusted under 35 U.S.C. 154(b) by 0 days.

(21) Appl. No.: 16/115,235

(22) Filed: Aug. 28, 2018

(65) Prior Publication Data

US 2018/0364940 A1    Dec. 20, 2018

Related U.S. Application Data

(63) Continuation-in-part of application No. 13/289,200, filed on Nov. 4, 2011, now Pat. No. 10,084,770.

(60) Provisional application No. 61/411,478, filed on Nov. 9, 2010.

(51) Int. Cl.
```
G06F 3/06      (2006.01)
G06F 9/455     (2018.01)
G06F 11/10     (2006.01)
```
(52) U.S. Cl.
CPC .......... *G06F 3/0647* (2013.01); *G06F 3/0604* (2013.01); *G06F 3/067* (2013.01); *G06F 3/0617* (2013.01); *G06F 3/0619* (2013.01); *G06F 3/0664* (2013.01); *G06F 9/45558* (2013.01); *G06F 11/1076* (2013.01); *G06F 2009/4557* (2013.01); *G06F 2009/45583* (2013.01)

(58) Field of Classification Search
CPC ...... G06F 12/02; G06F 3/0647; G06F 3/0604; G06F 3/0617; G06F 3/0619; G06F 3/0664; G06F 3/067; G06F 9/45558; G06F 11/1076; G06F 2009/4557; G06F 2009/45583
USPC ................................. 711/165, 114
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |

(Continued)

OTHER PUBLICATIONS

Chung; An Automatic Data Segmentation Method for 3D Measured Data Points; National Taiwan University; pp. 1-8; 1998.

(Continued)

*Primary Examiner* — Gautam Sain
(74) *Attorney, Agent, or Firm* — Garlick & Markison; Timothy W. Markison; Timothy D. Taylor

(57) ABSTRACT

A method includes migrating data within an addressing set to a second storage unit of the DSN. The method further includes establishing a virtual storage unit within the DSN regarding the addressing set. While migrating the data within the addressing set, the method further includes processing, by the virtual storage unit, data access requests having a DSN address within the addressing set. When the migrating the data is complete, the method further includes sending a notification to the virtual storage unit that the migration is complete. The method further includes coordinating, between the virtual storage unit and the second storage unit, an update of the second storage unit regarding the data access requests processed by the virtual storage unit.

14 Claims, 13 Drawing Sheets

(56) References Cited

U.S. PATENT DOCUMENTS

| | | | |
|---|---|---|---|
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 8,539,197 | B1 | 9/2013 | Marshall et al. |
| 2002/0062422 | A1 | 5/2002 | Butterworth et al. |
| 2002/0124137 | A1 | 9/2002 | Ulrich et al. |
| 2005/0083862 | A1* | 4/2005 | Kongalath ............... H04W 8/30 370/299 |
| 2006/0271605 | A1* | 11/2006 | Petruzzo ................. G06F 16/21 |
| 2007/0055840 | A1* | 3/2007 | Yamamoto ............ G06F 3/0613 711/165 |
| 2008/0109601 | A1* | 5/2008 | Klemm ................. G06F 3/0608 711/114 |
| 2009/0210431 | A1* | 8/2009 | Marinkovic ........ G06F 16/1827 |
| 2010/0228915 | A1* | 9/2010 | Ogihara ................ G06F 3/0607 711/114 |
| 2012/0036330 | A1* | 2/2012 | Saito ..................... G06F 3/0647 711/162 |
| 2012/0047346 | A1* | 2/2012 | Kawaguchi ........... G06F 3/0605 711/165 |

OTHER PUBLICATIONS

European Patent Office; Communication pursuant to Article 94(3) EPC; dated Feb. 23, 2018; 6 pgs.

European Patent Office; Extended European Search Report; dated Jun. 22, 2017; 5 pgs.

Harrison; Lightweight Directory Access Protocol (LDAP): Authentication Methods and Security Mechanisms; IETF Network Working Group; RFC 4513; Jun. 2006; pp. 1-32.

International Business Machines; Response to extended European Search Report; dated Jan. 3, 2018; 6 pgs.

International Search Report and Written Opinion: International Application No. PCT/US11/59616; dated Mar. 15, 2012; 7 pages.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

\* cited by examiner

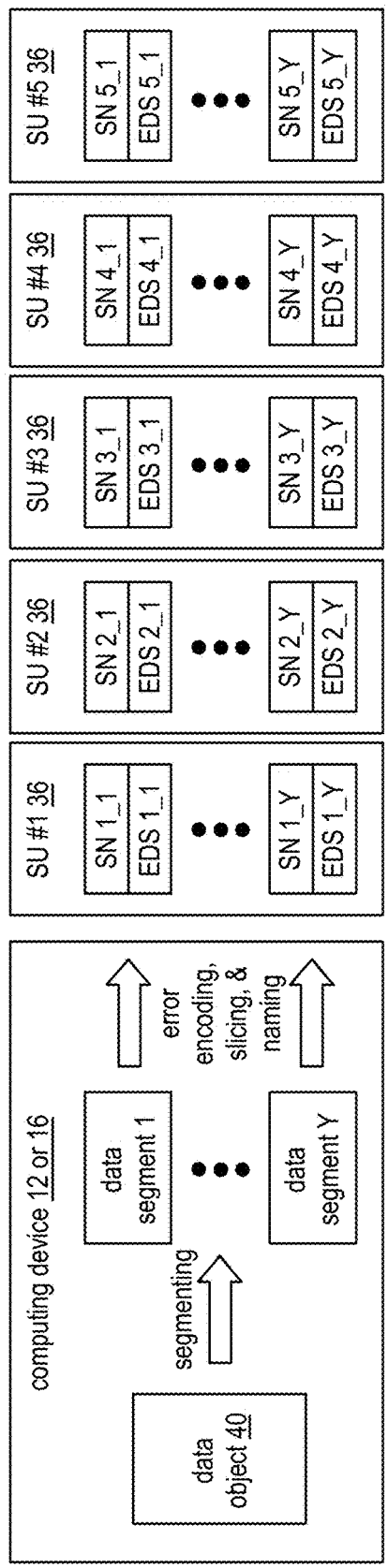
FIG. 3
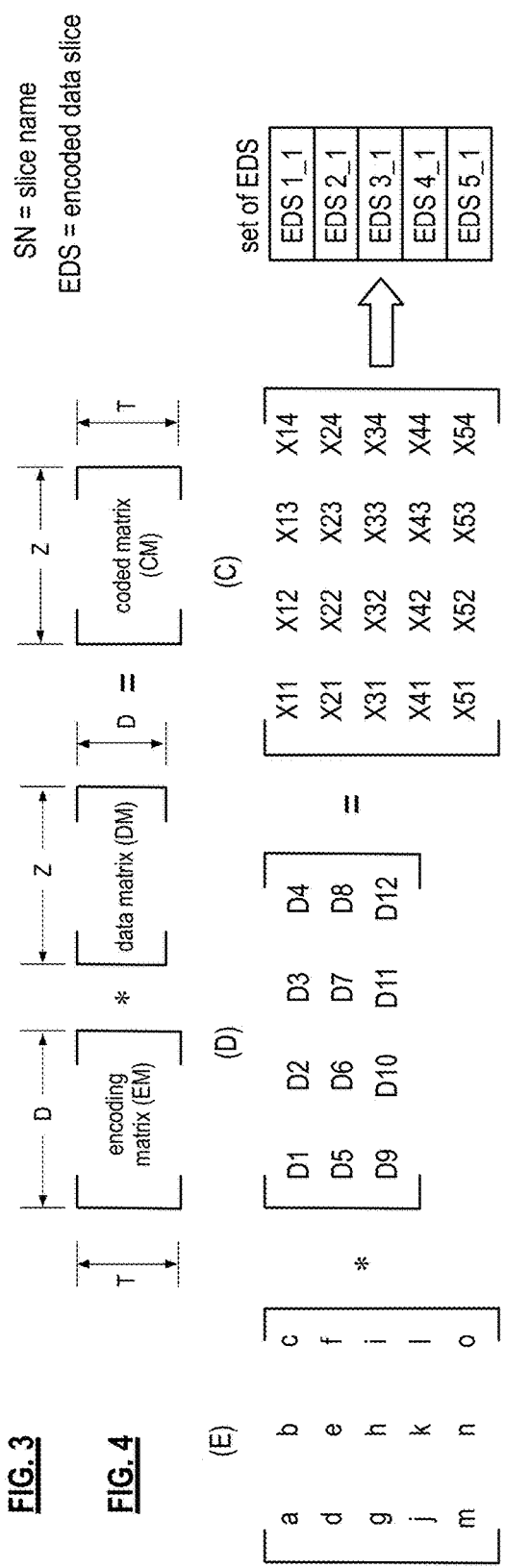
FIG. 4
FIG. 5
FIG. 6

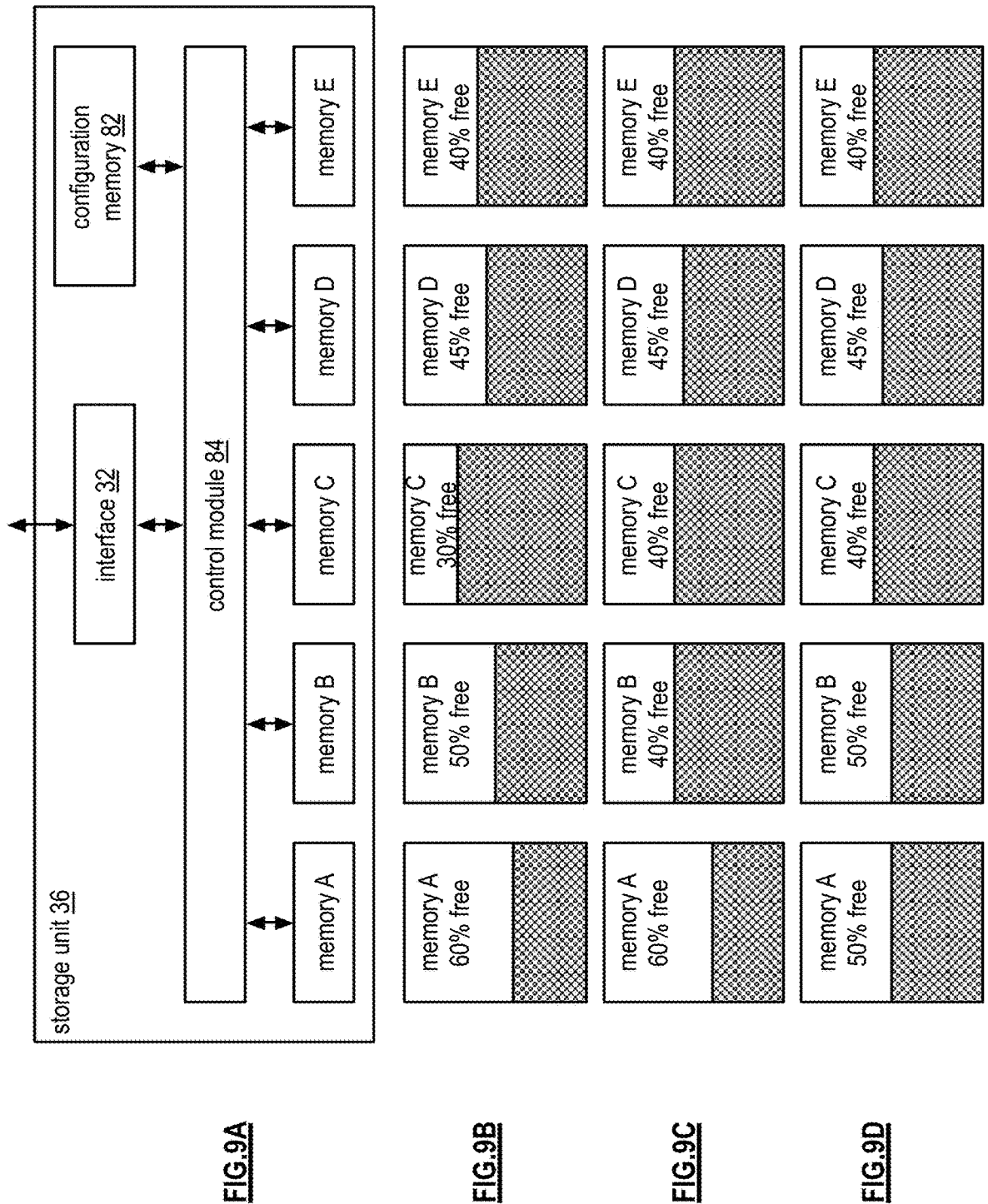

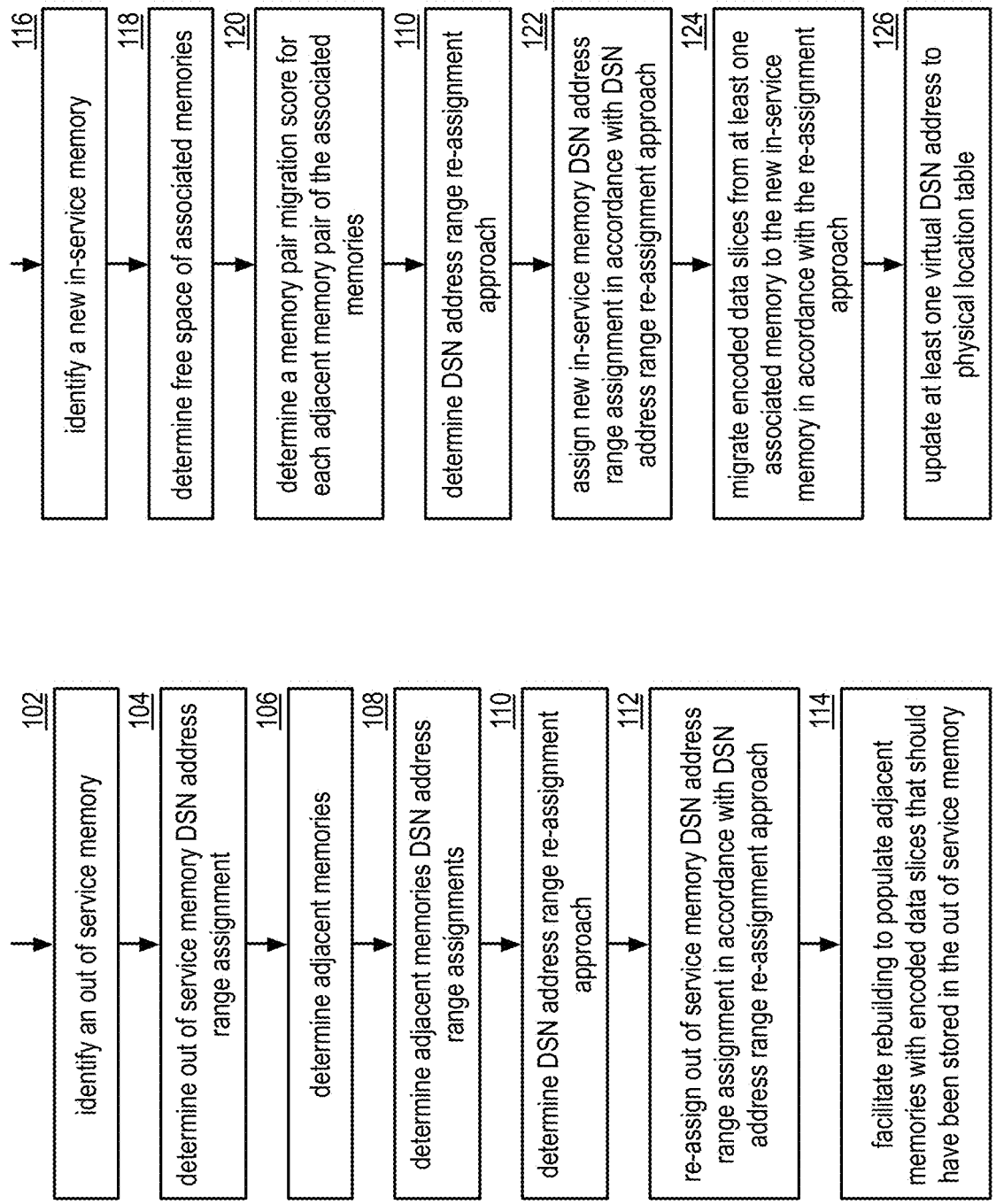

1

SUPPORTING LIVE MIGRATIONS AND RE-BALANCING WITH A VIRTUAL STORAGE UNIT

CROSS-REFERENCE TO RELATED APPLICATIONS

This application claims priority pursuant to 35 U.S.C. § 120 as a continuation-in-part of U.S. patent application Ser. No. 13/289,200, filed Nov. 4, 2011, entitled, "BALANCING MEMORY UTILIZATION IN A DISPERSED STORAGE NETWORK," which claims priority pursuant to 35 U.S.C. § 119(e) to U.S. Provisional Patent Application Ser. No. 61/411,478, filed Nov. 9, 2010, entitled "BALANCING MEMORY UTILIZATION IN A DISPERSED STORAGE NETWORK," both of which are hereby incorporated herein by reference in their entirety and made part of the present application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

It is further known, that during data migration, the availability of disks involved in the migration for normal IO is affected.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 9A is a schematic block diagram of an embodiment of a storage unit in accordance with the present invention;

FIG. 9B is a diagram illustrating an example of free memory availability for a plurality of memories in accordance with the present invention;

FIG. 9C is a diagram illustrating another example of free memory availability for a plurality of memories in accordance with the present invention;

FIG. 9D is a diagram illustrating another example of free memory availability for a plurality of memories in accordance with the present invention;

FIG. 10A is a flowchart illustrating an example of re-assigning memories in accordance with the present invention;

FIG. 10B is a flowchart illustrating an example of assigning a new memory in accordance with the present invention;

DETAILED DESCRIPTION OF THE INVENTION

Figure 1:
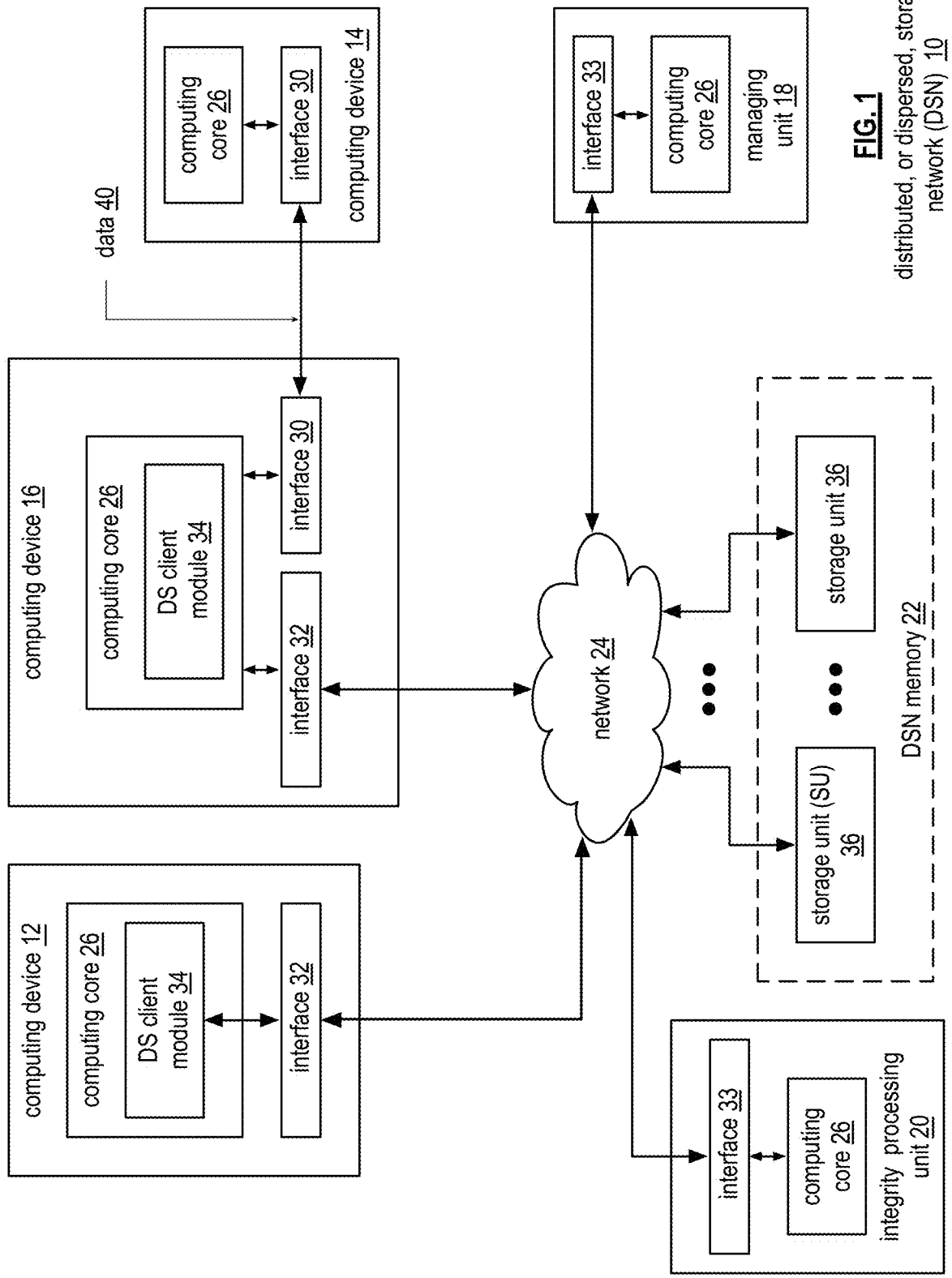
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
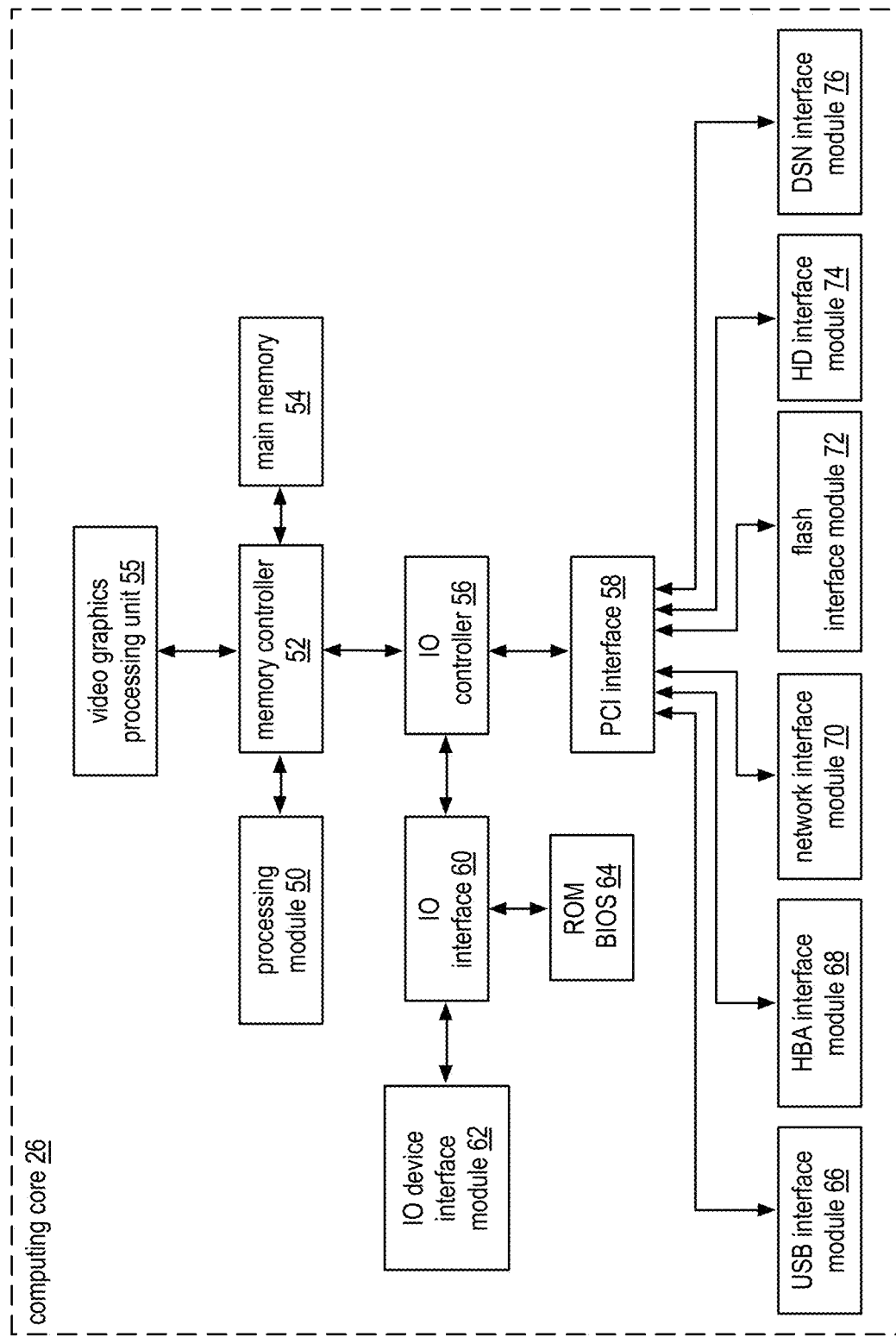
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
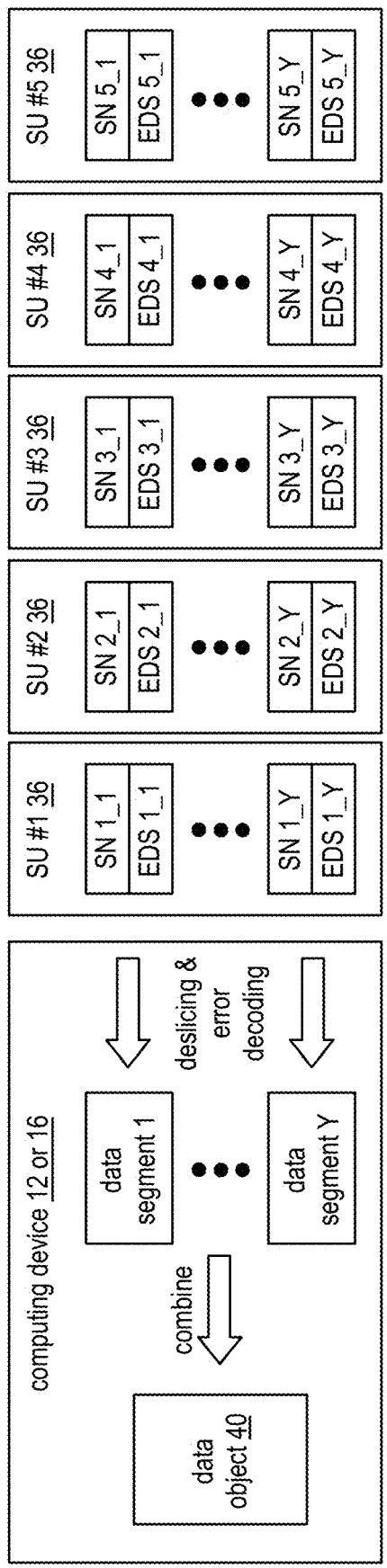
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
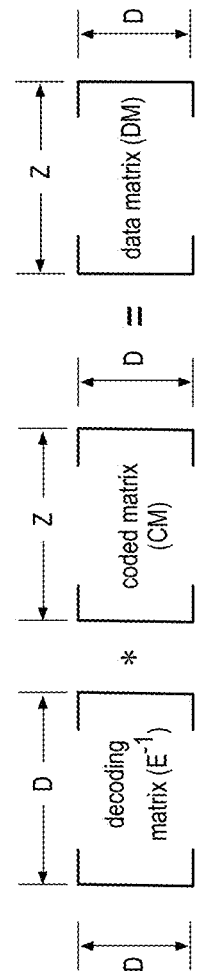
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9E:
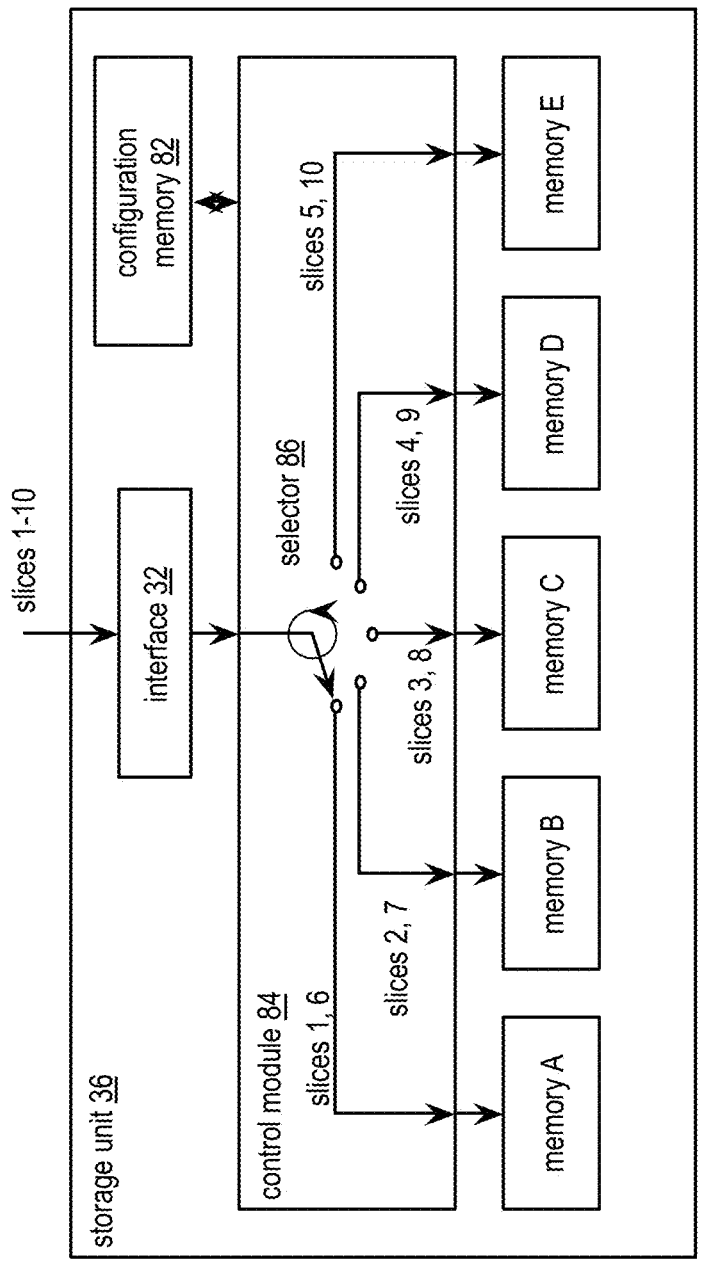
FIG. 9E is a schematic block diagram of another embodiment of a storage unit in accordance with the present invention.

FIG. 9A is a schematic block diagram of an embodiment of a storage unit 36 (e.g., a dispersed storage (DS) unit). The storage unit 36 includes a dispersed storage network (DSN) interface 32, a control module 84, a configuration memory 82, and a plurality of memories A-E. The control module may be implemented as logic in a computing core 26 and/or as a software algorithm operating on a computing core 26. A processing module of the control module may execute a method to control the plurality of memories A-E, stored encoded data slices in the plurality of memories A-E, retrieve encoded data slices from the plurality of memories, and utilize the configuration memory as a repository for configuration information (e.g., virtual DSN addressing range assignments for each of the memories) associated with the storage unit. Such a method is described in greater detail with reference to FIGS. 9B-9F. The configuration memory 82 and each memory of the plurality of memories A-E may be a read-only memory, random access memory, volatile memory, non-volatile memory, static memory, dynamic memory, flash memory, magnetic disk drive memory, solid state memory, cache memory, and/or any device that stores digital information. For example, the configuration memory 82 is implemented utilizing a solid-state flash memory and each of the plurality of memories A-E are implemented utilizing a magnetic disk drive memory.

As an example of initialization operation, the control module 84 receives a virtual DSN address range assignment message that includes an overall address range assignment for the storage unit 36. The control module 84 determines available memories as memories A-E based on one or more of configuration information retrieved from the configuration memory 82, an installation indicator, a query, and a message. The control module 84 determines subdivisions of the address range to assign to each of the plurality of memories A-E. For instance, the control module assigns address range 101-200 to memory A, address range 201-300 to memory B, address range 301-400 to memory C, address range 401-500 to memory D, and address range 501-600 to memory A when the overall address range assignment is 101-600. In such an instance, contiguous address ranges are assigned to the plurality of memories such that there are no gaps in address ranges. In the instance, each memory is assigned a uniform number of addresses within an address range assignment when an expected address range utilization is of a uniform nature. As another instance, the control module 84 assigns non-uniform address ranges to each of the memories A-E when the expected address range utilization is of a non-uniform nature. The control module 84 stores address range assignment information as configuration information in the configuration memory 82 (e.g., address range assignments by memory).

As an example of storage operation, the control module 84 receives a storage request via the interface 32, wherein the request includes an encoded data slice and slice name. The control module 84 retrieves configuration information from the configuration memory 82. The control module 84 determines an assigned memory based on the slice name and the configuration information such that the slice name address falls within an address range associated with the assigned memory. The control module 84 stores the encoded data slice in the assigned memory and updates the configuration information with the slice name. Note that a memory of the plurality of memories A-E may be utilized to store more data slices than other memories when the slice names of successive storage requests fall within an address range associated with the memory. Note that an amount of available free space of each of the memories may vary over time. A memory utilization balancing method is discussed in greater detail with reference to FIGS. 9B-9F.

FIG. 9B is a diagram illustrating an example of free memory (e.g., available memory) availability for a plurality of memories. For example, the plurality of memories A-E may be implemented in a single storage unit (e.g., dispersed storage (DS) unit). As another example, the plurality of memories A-E may be implemented in two or more storage units. As illustrated, memory A is 60% free (e.g., not utilized), memory B is 50% free, memory C is 30% free, memory D is 45% free, and memory E is 40% free. In such an example, memory C may have been utilized more often than other memories for data storage operations as memory C has a least amount of free space.

A rebalancing method may provide a memory utilization improvement wherein encoded data slices are migrated between one or more memories. Such a rebalancing method may determine how to migrate encoded data slices based on calculating a migration score for pairs of memories. For example, the migration score may be calculated as migration score (first memory, second memory)=|first memory free space−second memory free space|/min (first memory free space, second memory free space). For instance, migration score (memory A, memory B)=0.2, migration score (memory B, memory C)=0.667, migration score (memory C, memory D)=0.5, migration score (memory D, memory E)=0.125 based on memory free space for memories A-E as illustrated in FIG. 6B. Next, the migration score is compared to a migration threshold to determine whether the comparison is favorable. For example, the comparison is not favorable when the migration score of a memory pair is greater than migration threshold. For instance, the comparison is not favorable when the migration score (memory B, memory C)=0.667 and the migration threshold is 0.5. Alternatively, a memory pair may be selected for migration when an associated migration score is the highest of each migration score of the consecutive memory pairs. Next, encoded data slices may be moved from a memory with the least amount of free space of the memory pair to the other memory of the memory pair. For instance, encoded data slices may be moved from memory C to memory B to balance the memory utilization. Next, a configuration information update may indicate updated virtual dispersed storage network (DSN) address range assignments for the rebalanced memories such that the slice names of the encoded data slices that are associated with corresponding memories (e.g., where they are stored). The method to migrate encoded data slices is discussed in greater detail with reference to FIG. 9F.

FIG. 9C is a diagram illustrating another example of free memory availability for a plurality of memories subsequent to an encoded data slice migration as previously discussed with reference to FIG. 9B. As illustrated, memory A is 60% free memory B is 40% free, memory C is 40% free, memory D is 45% free, and memory E is 40% free. Note that memory B and memory C have 40% free as a result of rebalancing such a memory pair. The example continues such that a migration score may be calculated for each consecutive memory pair of the plurality of memories. For instance, migration score (memory A, memory B)=0.5, migration score (memory B, memory C)=0.0, migration score (memory C, memory D)=0.125, migration score (memory D, memory E)=0.125 based on memory free space for memories A-E as illustrated in FIG. 6C. As an example of rebalancing, a memory pair of memory A and memory B is selected for rebalancing based on that memory pair having a highest migration score=0.5 of the memory pairs.

As alternative example, the memory pair of memory A and memory B is selected for rebalancing based on the migration score of 0.5 being greater than a migration threshold when the migration threshold is 0.4. Next, encoded data slices are migrated from a memory with the least amount of free space of the memory pair to the other memory of the memory pair. For instance, encoded data slices are moved from memory B to memory A to balance the memory utilization. Next, a configuration information update indicates updated virtual dispersed storage network (DSN) address range assignments for the rebalanced memories such that the slice names of the encoded data slices that are associated with corresponding memories (e.g., where they are stored).

FIG. 9D is a diagram illustrating another example of free memory availability for a plurality of memories subsequent to an encoded data slice migration as previously discussed with reference to FIG. 9C. As illustrated, memory A is 50% free memory B is 50% free, memory C is 40% free, memory D is 45% free, and memory E is 40% free. Note that memory A and memory B have 50% free as a result of rebalancing such a memory pair. The example continues such that a migration score may be calculated for each consecutive memory pair of the plurality of memories (e.g., as previously discussed). For instance, migration score (memory A, memory B)=0.0, migration score (memory B, memory C)=0.25, migration score (memory C, memory D)=0.125, migration score (memory D, memory E)=0.125 based on memory free space for memories A-E as illustrated in FIG. 6D. As example of rebalancing, a memory pair of memory B and memory C is chosen for rebalancing based on that memory pair having a highest migration score=0.25 of the memory pairs.

As an alternative example, the memory pair of memory B and memory C is chosen for rebalancing based on the migration score of 0.25 being greater than a migration threshold when the migration threshold is 0.2. Next, encoded data slices are migrated from a memory with the least amount of free space of the memory pair to the other memory of the memory pair. For instance, encoded data slices are migrated from memory B to memory C to balance the memory utilization. Next, a configuration information update indicates updated virtual dispersed storage network (DSN) address range assignments for the rebalanced memories such that the slice names of the encoded data slices that are associated with corresponding memories (e.g., where they are stored).

FIG. 9E is a schematic block diagram of another embodiment of a storage unit 36 (e.g., a dispersed storage (DS) unit). The storage unit 36 includes a dispersed storage network (DSN) interface 32, a control module 84, a configuration memory 82, and a plurality of memory devices A-E. The control module 84 includes a selector 86 to route a selected encoded data slice from a plurality of received encoded data slices to a selected memory of the memories A-E. The selected slice may be routed to the selected memory in accordance with at least one of a slice name addressing approach and a quantity load balancing function. The control module 84 determines the selected memory based on a slice name associated with the encoded data slice when the slice name addressing approach is utilized.

The control module 84 stores a plurality of encoded data slices in the plurality of memory devices A-E of a storage unit of a dispersed storage network (DSN) memory using the quantity load balancing function when the quantity load balancing function is utilized. The control module 84 stores the plurality of encoded data slices in the plurality of memory devices A-E using the quantity load balancing function to substantially balance a quantity of encoded data slices stored within each of the plurality of memory devices, wherein data size of at least some of the plurality of encoded data slices is different. The quantity load balancing includes at least one of a round robin even distribution approach by quantity of encoded data slices, an uneven distribution approach by quantity of encoded data slices (e.g., 2 slices to memory A for every 1 slice to memories B-E), and a skipping distribution approach by quantity of encoded data slices (e.g., 1 slice to memory A, no slices to memory B, and 1 slice to memories C-E).

As an example of operation, the DSN interface 32 receives encoded data slices 1-10. The DSN interface 32 forwards the encoded data slices 1-10 to the control module 84. The control module 84 determines the quantity load balancing function to include the round robin scheme of storage of the encoded data slices 1-10 evenly amongst the plurality of memory devices A-E based on a predetermination. The control module 84 controls the selector 86 to route the encoded data slice 1 to memory A, encoded data slice 2 to memory B, encoded data slice 3 to memory C, encoded data slice 4 to memory D, encoded data slice 5 to memory E, encoded data slice 6 to memory A, encoded data slice 7 to memory B, encoded data slice 8 to memory C, encoded data slice 9 to memory D, and encoded data slice 10 to memory E.

Figure 9F:
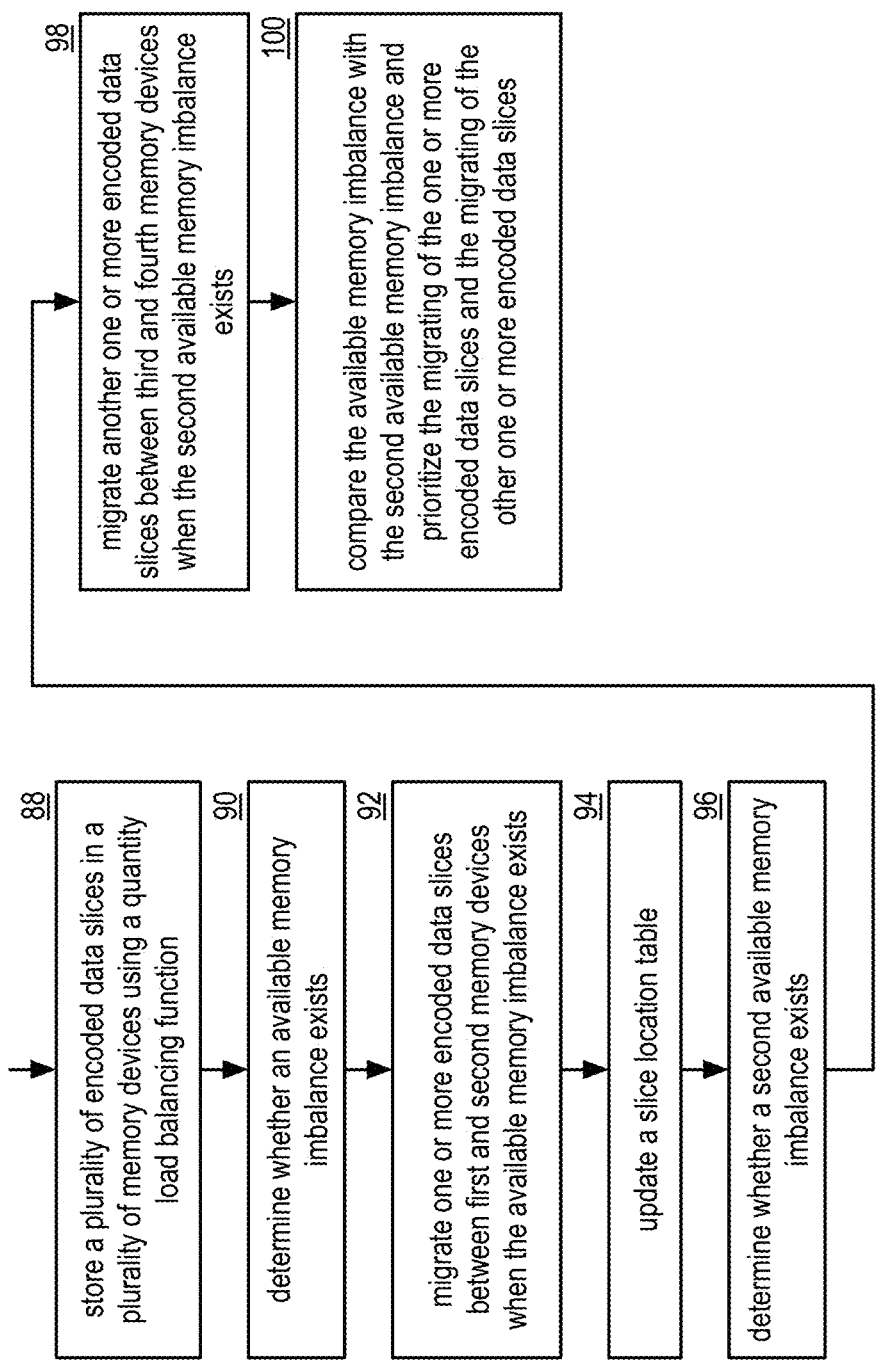
FIG. 9F is a flowchart illustrating an example of migrating encoded data slices in accordance with the present invention.

FIG. 9F is a flowchart illustrating an example of migrating encoded data slices. The method begins with step 88 where a processing module (e.g., of a storage unit) stores a plurality of encoded data slices in a plurality of memory devices of a storage unit of a dispersed storage network (DSN) memory using a quantity load balancing function to substantially balance a quantity of encoded data slices stored within each of the plurality of memory devices, wherein data size of at least some of the plurality of encoded data slices is different.

The method continues at step 90 where the processing module determines whether an available memory imbalance exists between a first memory device of the plurality of memory devices and a second memory device of the plurality of memory devices. The determining whether the available memory imbalance exists includes determining an available memory value of the first memory device, determining an available memory value of the second memory device, determining a difference available memory value based on the available memory values of the first and second memory device, comparing the difference available memory value with an available memory differential threshold, and when the comparing the difference available memory value with the available memory differential threshold is unfavorable, indicating that the available memory imbalance exists. The available memory differential threshold may be very low such that any difference triggers a migration.

The determining the difference available memory value includes at least one of subtracting the available memory value of the first memory device from the available memory value of the second memory device to produce the difference available memory value and calculating a migration score based on a subtraction of the available memory value of the first memory device from the available memory value of the second memory device to produce an available memory resultant value and dividing the available memory resultant value from one of the available memory value of the first memory device and the available memory value of the second memory device. For example, the processing module may determine the migration score in accordance with a formula of: migration score=|the first memory availability level−the second memory availability level|/min (the first memory availability level, the second memory availability level).

The method continues at step 92, when the available memory imbalance exists, where the processing module migrates one or more encoded data slices between the first and second memory devices to reduce the available memory imbalance. The migrating the one or more encoded data slices between the first and second memory devices includes, when the available memory imbalance exists because an available memory value of the first memory device is less than an available memory value of the second memory device, selecting the one or more encoded data slices associated with the first memory for migration to produce a migration set of encoded data slices, retrieving the migration set of encoded data slices from the first memory, storing the migration set of encoded data slices in the second memory, modifying a first set of DSN addresses associated with the first memory device to produce a modified first set of DSN addresses, and modifying a second set of DSN addresses associated with the second memory device to produce a modified second set of DSN addresses.

The selecting the one or more encoded data slices includes determining a magnitude of the available memory imbalance, determining data size of the one or more encoded data slices, and selecting the one or more encoded data slices based on the magnitude of the available memory imbalance and the data size of the one or more encoded data slices. Alternatively, the selecting the one or more encoded data slices includes at least one of identifying encoded data slices based on an encoded data slice priority level and identifying encoded data slices based on an encoded data slice type indicator.

The method continues at step 94 where the processing module updates a slice location table based on the migrating the one or more encoded data slices between the first and second memory devices. The modifying the first set of DSN addresses to produce the modified first set of DSN addresses includes modifying the first set of DSN addresses to exclude DSN addresses associated with the migration set of encoded data slices. The modifying the second set of DSN addresses to produce the modified second set of DSN addresses includes modifying the second set of DSN addresses to include DSN addresses associated with the migration set of encoded data slices.

The method continues at step 96 where the processing module determines whether a second available memory imbalance exists between a third memory device of the plurality of memory devices and a fourth memory device of the plurality of memory devices. The method continues at step 98, when the second available memory imbalance exists, where the processing module migrates another one or more encoded data slices between the third and fourth memory devices to reduce the available memory imbalance.

The method continues at step 100 where the processing module compares the available memory imbalance with the second available memory imbalance and prioritizes the migrating of the one or more encoded data slices between the first and second memory devices and the migrating of the other one or more encoded data slices between the third and fourth memory devices based on the comparing. For example, the processing module prioritizes migrating the other one or more encoded data slices between the third and fourth memory devices when the second available memory imbalance includes an imbalance that is greater than the imbalance of the available memory imbalance. Alternatively, processing module considers imbalances of all possible pairings of memory devices to prioritize encoded data slice migration.

FIG. 10A is a flowchart illustrating an example of re-assigning memories. The method begins with step 102 where a processing module (e.g., of a storage unit) identifies an out of service memory. The identification may be based on one or more of a failed memory indicator, a memory removal indicator, a maintenance schedule, a downtime schedule, a power-down schedule, a power savings indicator, a management input, an error rate history, a memory device type, a memory manufacturer indicator, a memory size indicator, and a bandwidth utilization indicator. For example, the processing module identifies the out of service memory when the processing module receives the failed memory indicator. As another example, the processing module identifies the out of service memory when the processing module receives the memory removal indicator.

The method continues at step 104 where the processing module determines an out of service memory dispersed storage network (DSN) address range assignment. The determination may be based on one or more of the out of service memory, a virtual DSN address to physical location table lookup, a message, and a list. For example, the processing module utilizes an identifier associated with the out of service memory to index in the virtual DSN address to physical location table to determine the address range assignment of the out of service memory.

The method continues at step 106 where the processing module determines adjacent memories. Note that adjacent memories includes memories that are adjacent with respect to a virtual dispersed storage network (DSN) addresses. The determination may be based on one or more of the out of service memory, the out of service memory DSN address range assignment, a virtual DSN address to physical location table lookup, a message, and a list. For example, the processing module retrieves identities of the adjacent memories associated with address ranges above and below the address range of the out of service memory from the virtual DSN address to physical location table. The method continues at step 108 where the processing module determines adjacent memories DSN address range assignments (e.g., based on a virtual DSN address to physical location table lookup).

The method continues at step 110 where the processing module determines a DSN address range re-assignment approach. The re-assignment approach may include how much encoded data slice storage of the out of service memory to assign to the adjacent memories (e.g., evenly, in proportion to free space, per a predetermination). The determination may be based on one or more of adjacent memory free space, a re-assigning goal, out of service memory utilization, a data type indicator, a user identifier, and a slice name. For example, the processing module determines the DSN address range reassignment approach includes dividing encoded data slice storage burden of the out of service memory evenly between the two adjacent memories when the reassigning goal indicates to divide evenly and the adjacent memory free space is sufficient as compared to the out of service memory utilization (e.g., there is enough space).

The method continues at step 112 where the processing module re-assigns out of service memory DSN address range assignment in accordance with the DSN address range re-assignment approach. For example, the processing module re-assigns address range 101-250 to adjacent memory 1, address range 251-400 to adjacent memory 2, and no address range assignment to the out of service memory when the out of service memory DSN address range previous assignment was 201-300, adjacent memory 1 DSN address range previous assignment was 101-200, and adjacent memory 2 DSN address range previous assignment was to 301-400 when the DSN address range re-assignment approach is to split the out of service memory DSN address range assignment in half between the two adjacent memories.

The method continues at step 114 where the processing module facilitates rebuilding to populate the adjacent memories with encoded data slices that should have been stored in the out of service memory. For example, the processing module sends a rebuilding message to the storage integrity processing unit that includes the out of service memory DSN address range such that slice names within that address range are rebuilt and stored in the adjacent memories. As another example, the processing module rebuilds the encoded data slices by retrieving a threshold number of encoded data slices per encoded data slice set (e.g., slices of a data segment), dispersed storage error decode the threshold number of encoded data slices to produce a data segment, dispersed storage error encode the data segment to reproduce the encoded data slice set, and store the encoded data slice set in the adjacent memories in accordance with the DSN address range re-assignment approach and DSN address range assignments of each of the adjacent memories.

FIG. 10B is a flowchart illustrating an example of assigning a new memory that includes similar steps to FIG. 10A. The method begins with step 116 where a processing module (e.g., of a storage unit) identifies a new in-service memory. The identification may be based on one or more of an activated memory indicator, a memory insertion indicator, a maintenance schedule, a uptime schedule, a power-up schedule, a power savings indicator, a management input, an error rate history, a memory device type, a memory manufacturer indicator, a memory size indicator, and a bandwidth utilization indicator. For example, the processing module identifies the new in-service memory when the processing module receives the activated memory indicator. As another example, the processing module identifies the new in-service memory when the processing module receives an indication that bandwidth utilization may rise.

The method continues at step 118 where the processing module determines free space of associated memories. For example, the associated memories may include memories common to a dispersed storage (DS) unit. As another example, the associated memories may include memories of two DS units. The determination of free space may be based on one or more of a list, a message, a query, and a memory utilization table lookup. The method continues at step 120 where the processing module determines a memory pair migration score for each adjacent memory pair of the associated memories. The method continues with step 110 of FIG. 10A where the processing module determines a dispersed storage network (DSN) address range re-assignment approach. For example, the processing module determines the DSN address range re-assignment approach to migrate an equal number of slices from two of the associated memories to the new in-service memory. The method continues at step 122 where the processing module assigns the new in-service memory DSN address range assignment in accordance with the DSN address range re-assignment approach. For example, the processing module determines the DSN address range re-assignment to include equal number of address range re-assignments from a first associated memory and a second associated memory to the new in-service memory address range assignment.

The method continues at step 124 where the processing module migrates encoded data slices from at least one associated memory to the new in-service memory in accordance with the re-assigned approach. For example, the processing module migrates encoded data slices from the first associated memory to the new in-service memory and migrates encoded data slices from the second associated memory to the new in-service memory as previously discussed. The method continues at step 126 where the processing module updates at least one virtual DSN address to physical location table to match the reassigned address ranges (e.g., a local table, a DSN-wide table). For example, a slice name associated with an encoded data slice to migrate is associated with the new in-service memory and is disassociated with an out of service memory.

Figure 11:
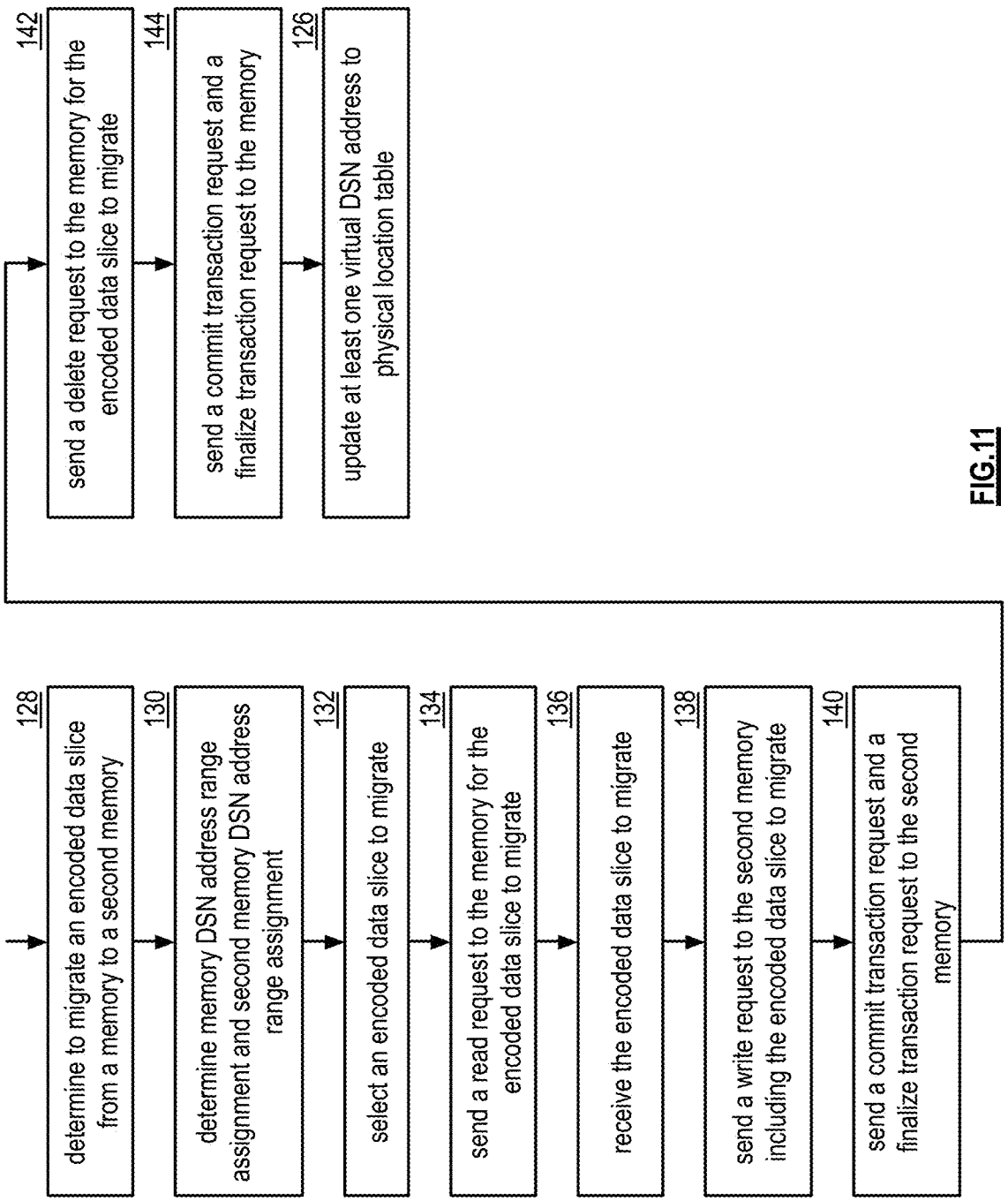
FIG. 11 is a flowchart illustrating another example of migrating encoded data slices in accordance with the present invention.

FIG. 11 is a flowchart illustrating another example of migrating encoded data slices, which includes similar steps to FIG. 10B. The method begins with step 128 where a processing module (e.g., of a dispersed storage (DS) processing unit (e.g., computing device 12 or 16)) determines to migrate an encoded data slice from a memory to a second memory. The memory and the second memory may be included as memories of a storage unit (e.g., a dispersed storage (DS) unit). The processing module may determine to migrate a plurality of encoded data slices. The determination may be based on one or more of a migration score, a migration threshold, a memory free space indicator, a message, a predetermination, a failed memory indicator, and a new in-service memory indicator. For example, the processing module determines to migrate the encoded data slice from the memory to the second memory when the processing module determines that a migration score associated with the first and second memories is above a migration threshold.

The method continues at step 130 where the processing module determines memory dispersed storage network (DSN) address range assignment and second memory DSN address range assignment. The determination may be based on one or more of a number of encoded data slices to migrate, a system-wide virtual DSN address to physical location table lookup, a local virtual DSN to physical location table lookup, a message, and a list. For example, the processing module determines the memory DSN address range assignment and the second memory DSN address range assignment to move a boundary between the address ranges by one slice name corresponding to the encoded data slice to migrate.

The method continues at step 132 where the processing module selects an encoded data slice to migrate. For example, the encoded data slice to migrate may be a first encoded data slice to migrate of a plurality of encoded data slices. As another example, the encoded data slice to migrate may be a next encoded data slice to migrate of the plurality of encoded data slices. The method continues at step 134 where the processing module sends a read request message to a memory corresponding to the encoded data slice to migrate (e.g., including an associated slice name).

The method continues at step 136 where the processing module receives the encoded data slice to migrate. The method continues at step 138 where the processing module sends a write request message to the second memory that includes the encoded data slice to migrate and the associated slice name. The method continues at step 140 where the processing module sends a commit transaction request message and a finalize transaction request message to the second memory to facilitate storing the encoded data slice in the second memory. Alternatively, the processing module may send the commit transaction request message upon receiving a favorable write response message in response to the sending of the write request message to the second memory.

The method continues at step 142 where the processing module sends a delete request message to the memory that includes the slice name of the encoded data slice to migrate. Alternatively, the processing module may send the delete request message upon receiving a favorable commit transaction response message in response to sending the commit transaction request message to the second memory. The method continues at step 144 where the processing module sends a commit transaction request message and a finalize transaction request message to the memory to finish deleting the encoded data slice to migrate. Alternatively, the processing module sends the commit transaction request message upon receiving a favorable delete response message in response to sending of the delete request message to the memory. The method continues at step 126 of FIG. 10B where the processing module updates at least one virtual DSN address to physical location table (e.g., the slice name associated with the encoded data slice to migrate is moved from the address range of the memory to the address range of the second memory).

In addition, the processing module may form a virtual storage unit for the memory in the second memory such that read requests and write requests are coordinated while the migration of the encoded data slice is executed. In such a virtual store arrangement, simultaneous reads and writes to the memory and second memory may be prohibited to avoid synchronization issues. For instance, only one store slice request is executed at a time when two or more store slice requests are received for the memory and the second memory. As another instance, only one retrieve slice request is executed at a time when two or more retrieve slice requests are received for the memory and the second memory.

Figure 12B:
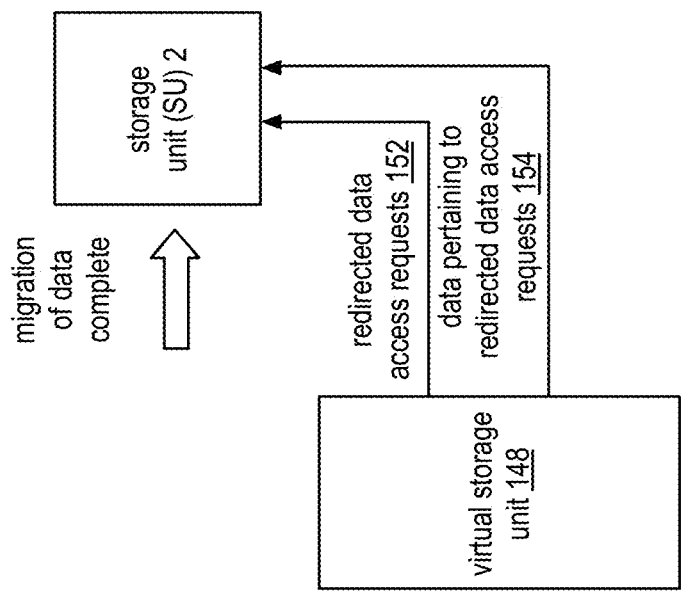
FIGS. 12A-12B are schematic block diagrams of an embodiment of the dispersed or distributed storage network (DSN) in accordance with the present invention.
Figure 12A:
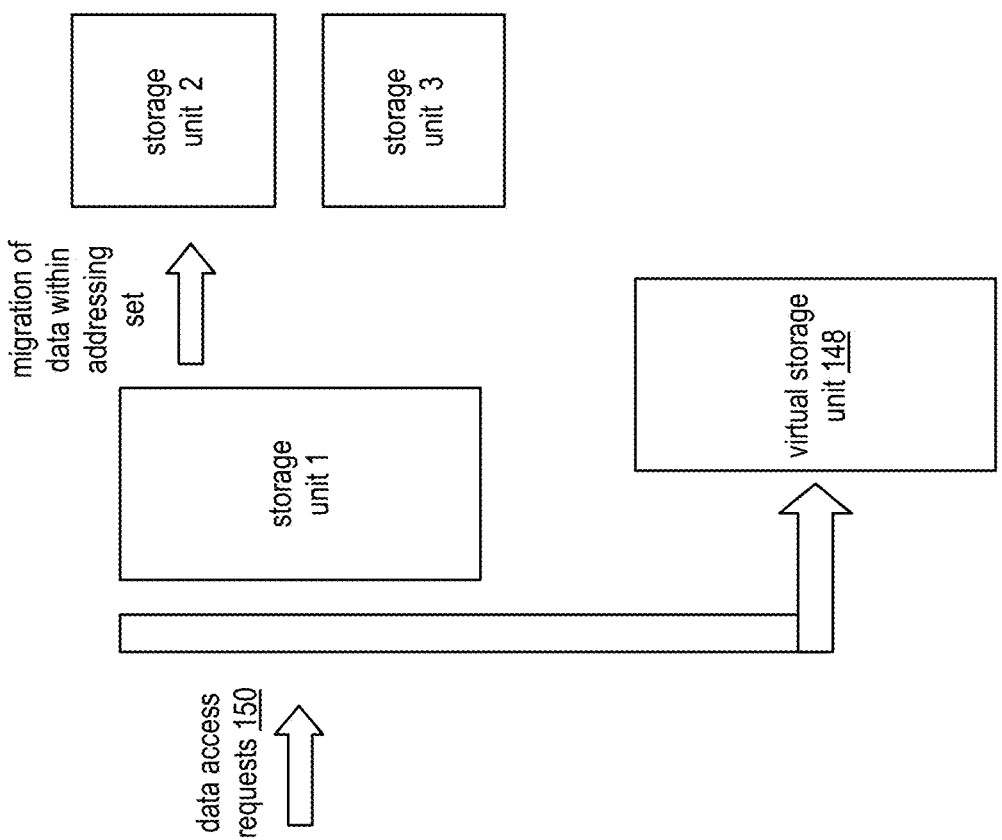

FIGS. 12A-12B are schematic block diagrams of an embodiment of the dispersed or distributed storage network (DSN). FIG. 12A includes storage units 1-3 and virtual storage unit 148. Storage unit 1 migrates data within an addressing set (e.g., one or more DSN addresses) to storage unit 2. Some or all data stored on storage unit 1 may be migrated to storage unit 2 for many reasons. For example, all data stored on storage unit 1 may be migrated to storage unit 2 in the event that storage unit 1 is replaced with storage unit 2 (e.g., storage unit 1 has failed). As another example, a portion of data stored on storage unit 1 may be migrated to storage unit 2 to free up memory space on storage unit 1. As another example, data may be migrated from storage unit 1 to storage unit 2 as a result of a change in virtual to physical mapping within the DSN. As a further example, storage unit 2 may be added to a group of storage units that store a pillar of data for sets of encoded data slices. Further, data from storage unit 1 may be migrated to more than one storage unit. For example, storage unit 1 may migrate data within a first portion of the addressing set to storage unit 2 and data within a second portion of the addressing set to storage unit 3 of the DSN. Here, storage unit 1 migrates data to storage unit 2.

During migration, the storage units involved continue to receive data access requests (e.g., reads, writes, lists, edits, etc.) which can result in processing errors or delays. For example, a read request sent to storage unit 1 pertaining to data that is currently being migrated to storage unit 2, would result in an error. In order to maintain normal processing during migration, a virtual storage unit 148 is established. For example, a computing device of the DSN (e.g., computing device 12 or 16, etc.) establishes the virtual storage unit 148 by allocating at least a portion of one or more other storage units of the DSN as the virtual storage unit 148.

While the data within the addressing set is migrating from storage unit 1 to storage unit 2, virtual storage unit 148 processes data access requests 150 having a DSN address within the addressing set. When the migration is complete, the computing device sends a notification to the virtual storage unit 148 that the migration is complete. An update of storage unit 2 regarding the data access requests 150 processed by the virtual storage unit is coordinated between the virtual storage unit 148 and storage unit 2.

The virtual storage unit 148 may also maintain a cursor which moves across the namespace as data is migrated. A listing operation is begun on storage unit 1 and may be either ascending or descending depending on the direction of the migration across the namespace. For each slice in the list and each revision of that slice, it will be read from storage unit 1, written to storage unit 2, committed to storage unit 2, deleted from storage unit 1, and the slice deletion is committed and finalized on storage unit 1, lastly, the cursor position is updated to the current slice. This continues until the utilization level is balanced between storage unit 1 and storage unit 2.

FIG. 12B includes virtual storage unit 148 and storage unit 2 and depicts coordinating the update of storage unit 2 after data migration is complete. Storage unit 2 obtains data access requests 152 processed by the virtual storage unit 148 and data pertaining to the data access requests 154. Storage unit 2 obtains data pertaining to the data access requests 154 by obtaining the update from the virtual storage unit 148 where the update includes the data pertaining to the data access requests 154 and/or storage unit 2 requests the data pertaining to the data access requests 154 from virtual storage unit 2. When coordinating the update is complete, a computing device of the DSN (e.g., computing device 12 or 16, etc.) deletes the virtual storage unit 148.

Figure 13A:
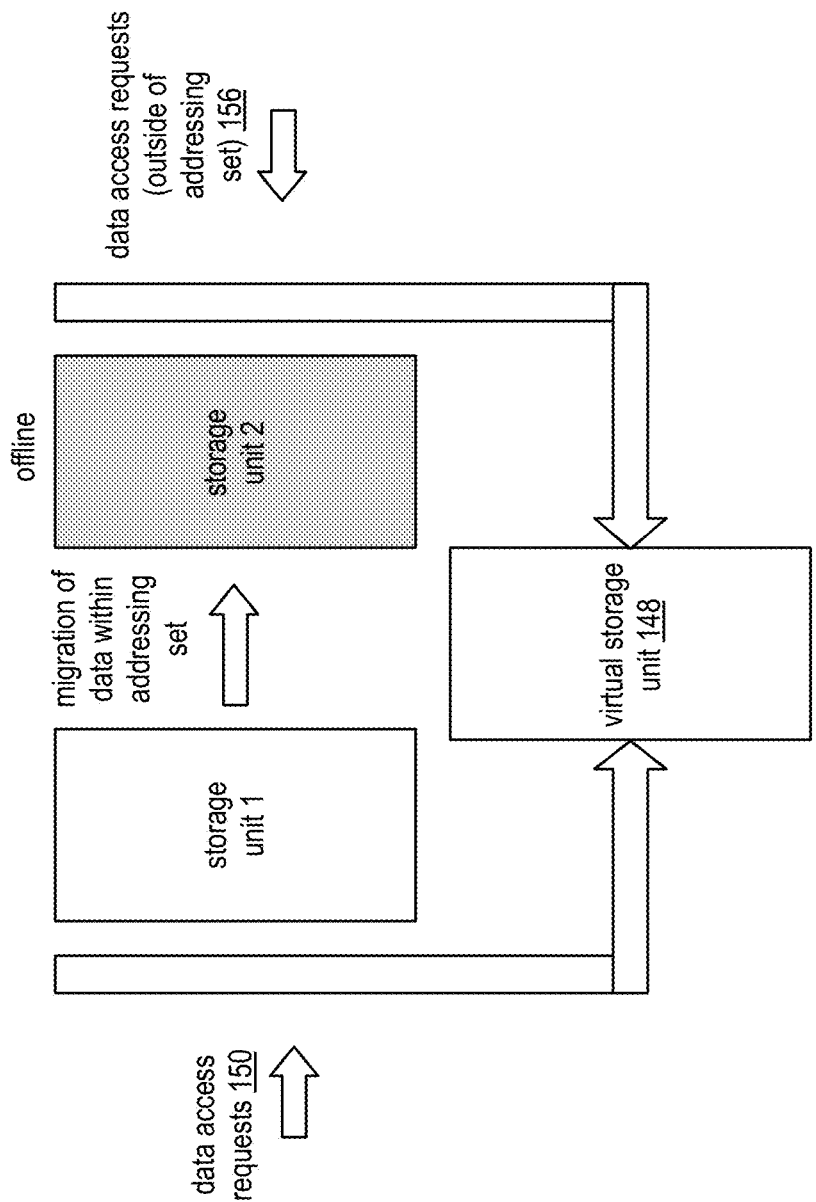
FIGS. 13A-13B are schematic block diagrams of another embodiment of the dispersed or distributed storage network (DSN) in accordance with the present invention.
Figure 13B:
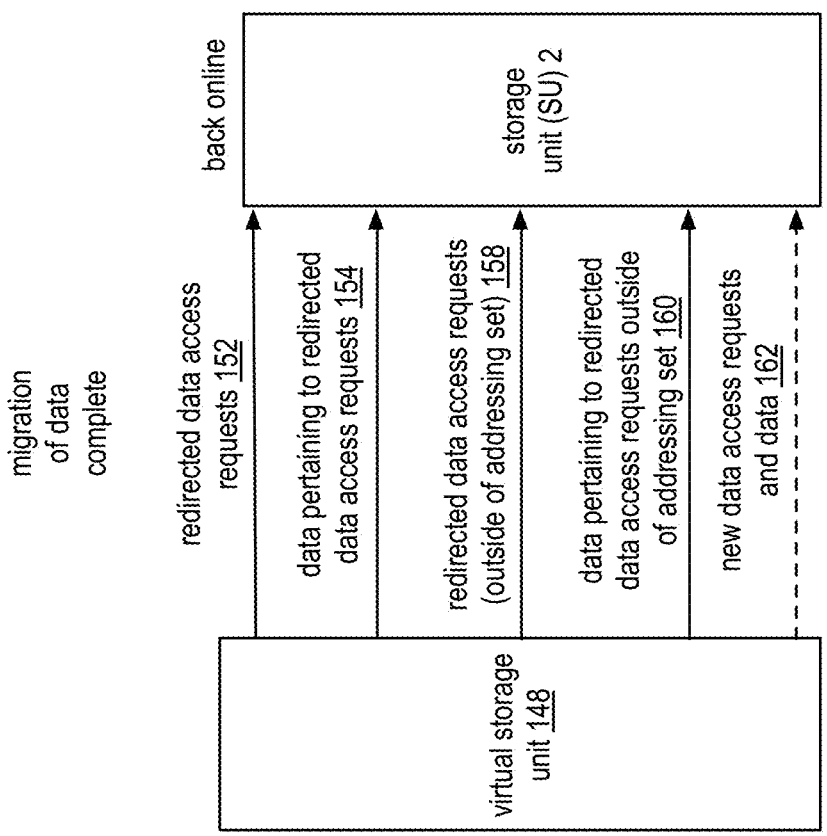

FIGS. 13A-13B are schematic block diagrams of another embodiment of the dispersed or distributed storage network (DSN). FIG. 13A includes storage unit 1, storage unit 2, and virtual storage unit 148 and operates similarly to FIG. 12A. However, during migration of data from storage unit 1 to storage unit 2, a computing device of the DSN (e.g., computing device 12 or 16, etc.) takes storage unit 2 offline. Storage unit 2 manages second data within a second addressing set.

The computing device establishes the virtual storage unit 148 to process second data access requests for the second addressing set 156 along with the data access requests 150 having a DSN address within the addressing set. While storage unit 2 is offline, virtual storage unit 148 processes second data access requests having a DSN address within the second addressing set 156.

FIG. 13B includes virtual storage unit 148 and storage unit 2 and depicts coordinating the update of storage unit 2 after data migration is complete. When storage unit 2 is back online, an update of storage unit 2 is coordinated between the virtual storage unit 148 and storage unit 2 regarding the second data access requests processed by the virtual storage unit and the data access requests processed by the virtual storage unit.

Coordinating the update includes selecting one of the virtual storage unit 148 and storage unit 2 to process new data access requests sent to storage unit 2 while the update is occurring. When virtual storage unit 148 is selected, the processing of the new data access requests is included in the update. As shown, the update involves storage unit 2 obtaining the data access requests processed by the virtual storage unit 152, the data pertaining to the data access requests 154, the second data access requests 158, the data pertaining to the second data access requests 160, and possibly the newly processed data access requests and data pertaining to the newly processes access requests 162. When the update is complete, the virtual storage unit 148 is deleted (e.g., by storage unit 2, the computing device, etc.).

Figure 14:
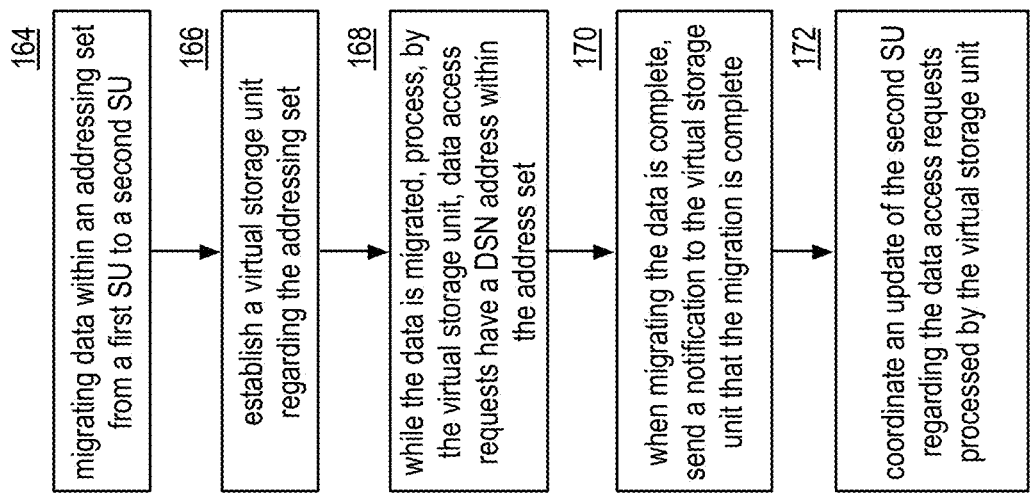
FIG. 14 is a logic diagram of an example of a method of utilizing a virtual storage unit during data migration in accordance with the present invention.

FIG. 14 is a logic diagram of an example of a method of utilizing a virtual storage unit during data migration. The method begins with step 164 where a first storage unit of a dispersed storage network (DSN) migrates data within an addressing set (e.g., one or more DSN address ranges) to a second storage unit of the DSN. The method continues with step 164 where the computing device of the DSN (e.g., computing device 12 or 16) establishes a virtual storage unit within the DSN regarding the addressing set. The computing device establishes the virtual storage unit by allocating at least a portion of one or more other storage units of the DSN as the virtual storage unit.

While migrating the data within the addressing set, the method continues with step 166 where the virtual storage unit processes data access requests (e.g., reads, writes, lists, edits, etc.) having a DSN address within the addressing set. When the migration is complete, the method continues with step 170 where the computing device sends a notification to the virtual storage unit that the migration is complete. The method continues with step 172 where an update of the second storage unit regarding the data access requests processed by the virtual storage unit is coordinated between the virtual storage unit and the second storage unit.

The coordinating the update involves the second storage unit obtaining the data access requests processed by the virtual storage unit and the data pertaining to the data access requests. The data pertaining to the data access requests may be obtained by the second storage unit obtaining the update from the virtual storage unit, where the update includes the data pertaining to the data access requests and/or the second storage unit requesting the data pertaining to the data access requests from the virtual storage unit.

During the migration of data, the computing device may take the second storage unit offline where the second storage unit manages second data within a second addressing set. In this case, the computing device establishes the virtual storage unit to also process second data access requests for the second addressing set. While the second storage unit is offline, the virtual storage unit processes second data access requests having a DSN address within the second addressing set. When the second storage unit is back online, the virtual storage unit and the second storage unit coordinate a second update of the second storage unit regarding the second data access requests processed by the virtual storage unit.

The coordinating the second update includes selecting one of the virtual storage unit and the second storage unit to process new data access requests while the second update is occurring. When the virtual storage unit is selected, the virtual storage unit includes the processing of the new data access requests in the second update. When the coordinating the update is complete, the computing device deletes the virtual storage unit.

As an additional example, the first storage unit may migrate first data of the data within a first portion of the addressing set to the second storage unit of the DSN and second data of the data within a second portion of the addressing set to a third storage unit of the DSN. When the migrating the data is complete, the virtual storage unit, the second storage unit, and the third storage unit coordinate an update of the second and third storage units regarding the data access requests processed by the virtual storage unit.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   determining, by a computing device of a storage network, to migrate, a plurality of encoded data slices within an addressing set stored on a first storage unit of the storage network to a second storage unit of the storage network, wherein the addressing set includes a plurality of storage network addresses corresponding to the plurality of encoded data slices, wherein data segments are dispersed storage error encoded into a plurality of sets encoded data slices in accordance with error encoding parameters, and wherein the plurality of sets encoded data slices include the plurality of encoded data slices;
   temporarily establishing, by the computing device for use during the migration, a virtual storage unit within the storage network regarding the plurality of encoded data slices and the addressing set;
   while migrating the plurality of encoded data slices:
      tracking, by the virtual storage unit, location of the plurality of encoded data slices;
      directing, by the computing device, data access requests having a storage network address outside the addressing set to the first storage unit;
      directing, by the computing device, data access requests having a storage network address within the addressing set to the virtual storage unit;
      processing, by the virtual storage unit, the data access requests in accordance with the tracked location of the plurality of encoded data slices, wherein the data access requests are processed in a one at a time manner; and
      temporarily storing, by the virtual storage unit, data pertaining to the processed data access requests; and
   when the migrating the plurality of encoded data slices is complete:
      sending, by the computing device, a notification to the virtual storage unit that the migration is complete; and
      coordinating, between the virtual storage unit and the second storage unit, an update of the second storage unit regarding the processed data access requests.

2. The method of claim 1, wherein the establishing the virtual storage unit comprises:
   allocating, by the computing device, at least a portion of one or more other storage units of the storage network as the virtual storage unit.

3. The method of claim 1, wherein the coordinating the update comprises one or more of:
   obtaining, by the second storage unit, the update from the virtual storage unit, wherein the update includes the data pertaining to the processed data access requests, and wherein the data includes encoded data slices pertaining to the processed data access requests; and
   requesting, by the second storage unit, the data pertaining to the processed data access requests from the virtual storage unit.

4. The method of claim 1 further comprises:
   taking, by the computing device, the second storage unit offline, wherein the second storage unit stores a second plurality of encoded data slices within a second addressing set;
   temporarily establishing, by the computing device, the virtual storage unit regarding the second plurality of encoded data slices and the second addressing set;
   while the second storage unit is offline:
      directing, by the computing device, second data access requests regarding the second plurality of encoded data slices and the second addressing set to the virtual storage unit;
      processing, by the virtual storage unit, the second data access requests;
      temporarily storing, by the virtual storage unit, data pertaining to the processed second data access requests; and
   when the second storage unit is back online:
      coordinating, between the virtual storage unit and the second storage unit, a second update of the second storage unit regarding the processed second data access requests.

5. The method of claim 4, wherein the coordinating the second update comprises:
   selecting one of the virtual storage unit and the second storage unit to process new data access requests while the second update is occurring;

when the virtual storage unit is selected, including, by the virtual storage unit, the processing of the new data access requests in the second update; and when the second update is complete, deleting, by the second storage unit, the virtual storage unit.

6. The method of claim 1 further comprises:
when the coordinating the update is complete:
   deleting, by the computing device, the virtual storage unit.

7. The method of claim 1 further comprises:
determining, by the computing device, to migrate a first set of encoded data slices of the plurality of encoded data slices to the second storage unit of the storage network and a second set of encoded data slices of the plurality of encoded data slices to a third storage unit of the storage network; and when the migrating the data is complete:
   coordinating, between the virtual storage unit, the second storage unit, and the third storage unit, an update of the second and third storage units regarding data access requests regarding the first and second set of encoded data slices processed by the virtual storage unit.

8. A computer readable memory comprises:
a first memory element that stores operational instructions that, when executed by a computing device of a storage network, causes the computing device to:
   determine to migrate a plurality of encoded data slices within an addressing set stored on a first storage unit of the storage network to a second storage unit of the storage network, wherein the addressing set includes a plurality of storage network addresses corresponding to the plurality of encoded data slices, wherein data segments are dispersed storage error encoded into a plurality of sets encoded data slices in accordance with error encoding parameters, and wherein the plurality of sets encoded data slices include the plurality of encoded data slices;

a second memory element that stores operational instructions that, when executed by the computing device, causes the computing device to:
   temporarily establish, for use during the migration, a virtual storage unit within the storage network regarding the plurality of encoded data slices and the addressing set; and
   while migrating the plurality of encoded data slices:
   direct data access requests having a storage network address within the addressing set to the virtual storage unit; and
   direct data access requests having a storage network address outside the addressing set to the first storage unit; and a third memory element that stores operational instructions that, when executed by the virtual storage unit, causes the virtual storage unit to:
   track location of the plurality of encoded data slices;
   process the data access requests in accordance with the tracked location of the plurality of encoded data slices, wherein the data access requests are processed in a one at a time manner; and
   temporarily store data pertaining to the processed data access requests; and a fourth memory element that stores operational instructions that, when executed by the computing device, causes the computing device to:
   when the migrating the plurality of encoded data slices is complete:
   send a notification to the virtual storage unit that the migration is complete; and a fifth memory element that stores operational instructions that, when executed by the second storage unit and the virtual storage unit, causes the second storage unit and the virtual storage unit to:
   when the migrating the data is complete:
   coordinate an update of the second storage unit regarding the processed data access requests.

9. The computer readable memory of claim 8, wherein the second memory element further stores operational instructions that, when executed by the computing device, causes the computing device to establish the virtual storage unit by:
   allocating at least a portion of one or more other storage units of the storage network as the virtual storage unit.

10. The computer readable memory of claim 8, wherein the fifth memory element further stores operational instructions that, when executed by the second storage unit and the virtual storage unit, causes the second storage unit and the virtual storage unit to coordinate the update by one or more of:
   obtaining, by the second storage unit, an update from the virtual storage unit, wherein the update includes the data pertaining to the processed data access requests, and wherein the data includes encoded data slices pertaining to the processed data access requests; and
   requesting, by the second storage unit, the data pertaining to the processed data access requests from the virtual storage unit.

11. The computer readable memory of claim 8 further comprises:
a sixth memory element that stores operational instructions that, when executed by the computing device, causes the computing device to:
   take the second storage unit offline, wherein the second storage unit stores a second plurality of encoded data slices within a second addressing set; and
   temporarily establish the virtual storage unit regarding the second plurality of encoded data slices and the second addressing set; and
   while the second storage unit is offline:
   direct second data access requests regarding the second plurality of encoded data slices and the second addressing set to the virtual storage unit; and a seventh memory element that stores operational instructions that, when executed by the virtual storage unit, causes the virtual storage unit to:
   while the second storage unit is offline:
   process the second data access requests;
   temporarily store data pertaining to the processed second data access requests; and an eighth memory element that stores operational instructions that, when executed by the second storage unit and the virtual storage unit, causes the second storage unit and the virtual storage unit to:
   when the second storage unit is back online:
   coordinate a second update of the second storage unit regarding the processed second data access requests.

12. The computer readable memory of claim 11, wherein the eighth memory element further stores operational instructions that, when executed by the second storage unit and the virtual storage unit, causes the second storage unit and the virtual storage unit to coordinate the second update by:

selecting one of the virtual storage unit and the second storage unit to process new data access requests while the second update is occurring;

when the virtual storage unit is selected, including, by the virtual storage unit, the processing of the new data access requests in the second update; and when the second update is complete, deleting, by the second storage unit, the virtual storage unit.

13. The computer readable memory of claim 8 further comprises:

a ninth memory element that stores operational instructions that, when executed by the computing device, causes the computing device to:

when the coordinating the update is complete:
delete the virtual storage unit.

14. The computer readable memory of claim 8 further comprises:

a tenth memory element that stores operational instructions that, when executed by the computing device, causes the computing device to:

determine to migrate a first set of encoded data slices of the plurality of encoded data slices to the second storage unit of the storage network and a second set of encoded data slices of the plurality of encoded data slices to a third storage unit of the storage network; and an eleventh memory element that stores operational instructions that, when executed by the virtual storage unit, the second storage unit, and the third storage unit, causes the virtual storage unit, the second storage unit, and the third storage unit to:

when the migrating the data is complete:
coordinate an update of the second and third storage units regarding data access requests regarding the first and second set of encoded data slices processed by the virtual storage unit.

* * * * *